United States Patent
Batenburg et al.

(10) Patent No.: US 7,913,496 B2
(45) Date of Patent: Mar. 29, 2011

(54) APPARATUS AND METHOD FOR PUMPING A CRYOGENIC FLUID FROM A STORAGE VESSEL AND DIAGNOSING CRYOGENIC PUMP PERFORMANCE

(75) Inventors: Greg Batenburg, Delta (CA); Gage Garner, Vancouver (CA); Gregory Harper, Vancouver (CA); Mike Ure, Delta (CA)

(73) Assignee: Westport Power Inc., Vancouver, BC (CA)

( * ) Notice: Subject to any disclaimer, the term of this patent is extended or adjusted under 35 U.S.C. 154(b) by 0 days.

(21) Appl. No.: 12/143,026

(22) Filed: Jun. 20, 2008

(65) Prior Publication Data
US 2008/0302111 A1    Dec. 11, 2008

Related U.S. Application Data

(63) Continuation of application No. PCT/CA2006/001962, filed on Nov. 29, 2006.

(30) Foreign Application Priority Data

Dec. 23, 2005  (CA) ..................... 2527563

(51) Int. Cl.
*F17C 13/00* (2006.01)
*F04B 49/00* (2006.01)
*F04B 51/00* (2006.01)

(52) U.S. Cl. ........... 62/50.6; 417/63; 417/901; 702/182; 702/185

(58) Field of Classification Search ............ 62/50.6, 62/50.2; 417/63, 43, 901; 702/185, 182
See application file for complete search history.

(56) References Cited

U.S. PATENT DOCUMENTS

| 4,667,477 | A |   | 5/1987  | Matsuda et al. |
| 5,010,868 | A |   | 4/1991  | Clements |
| 5,819,544 | A | * | 10/1998 | Andonian ............... 62/50.6 |
| 6,260,004 | B1 | * | 7/2001 | Hays et al. ............ 702/183 |
| 6,564,627 | B1 | * | 5/2003 | Sabini et al. ............ 73/168 |
| 6,631,615 | B2 |   | 10/2003 | Drube et al. |
| 6,698,211 | B2 |   | 3/2004  | Gustafson |
| 6,850,849 | B1 | * | 2/2005 | Roys ..................... 702/45 |
| 6,882,960 | B2 | * | 4/2005 | Miller .................. 702/182 |
| 7,112,037 | B2 | * | 9/2006 | Sabini et al. .......... 415/118 |
| 2002/0085921 | A1 | * | 7/2002 | Gram et al. ............. 417/53 |
| 2003/0144818 | A1 |   | 7/2003 | Kasuya et al. |

FOREIGN PATENT DOCUMENTS

| CA | 2362844 | 2/2002 |
| CA | 2401926 | 12/2002 |
| CA | 2504225 | 11/2005 |
| CA | 2527122 | 3/2006 |
| CA | 2523732 | 4/2006 |
| JP | 59-018284 | 1/1984 |

* cited by examiner

*Primary Examiner* — Cheryl J Tyler
*Assistant Examiner* — John F Pettitt
(74) *Attorney, Agent, or Firm* — McAndrews, Held & Malloy, Ltd.

(57) ABSTRACT

An apparatus and method are provided for pumping a cryogenic fluid from a storage vessel. The cryogenic fluid is pumped from the storage vessel to a heat exchanger and then to a delivery conduit. A pressure sensor measures fluid pressure in the delivery conduit. An electronic controller is programmed to monitor a signal from the pressure sensor, process the signal to determine from the measured process fluid pressure when cryogenic pump performance is degraded, and to send a signal to an operator of the apparatus indicating when the electronic controller determines that cryogenic pump performance has degraded below a predetermined threshold volumetric efficiency.

11 Claims, 5 Drawing Sheets

APPARATUS AND METHOD FOR PUMPING A CRYOGENIC FLUID FROM A STORAGE VESSEL AND DIAGNOSING CRYOGENIC PUMP PERFORMANCE

CROSS-REFERENCE TO RELATED APPLICATION(S)

This application is a continuation of International Application No. PCT/CA2006/001962, having an international filing date of Nov. 29, 2006, entitled "Apparatus And Method For Pumping A Cryogenic Fluid From A Storage Vessel And Diagnosing Cryogenic Pump Performance". The '962 international application claimed priority benefits, in turn, from Canadian Patent Application No. 2,527,563 filed Dec. 23, 2005. The '962 international application is hereby incorporated by reference herein in its entirety.

FIELD OF THE INVENTION

The present invention relates to an apparatus and method for pumping a cryogenic fluid from a storage vessel and diagnosing cryogenic pump performance to determine when volumetric efficiency is degrading.

BACKGROUND OF THE INVENTION

At cryogenic temperatures a gas can be stored in a storage vessel in liquefied form to achieve a higher storage density, compared to the same gas stored in the gaseous phase. For example, higher storage density is desirable when the gas is employed as a fuel for a vehicle because the space available to store fuel on board a vehicle is normally limited.

The desired temperature for storing a liquefied gas depends upon the particular gas. For example, at atmospheric pressure, natural gas can be stored in liquefied form at a temperature of minus 160 degrees Celsius, and a lighter gas such as hydrogen can be stored at atmospheric pressure in liquefied form at a temperature of minus 253 degrees Celsius. As with any liquid, the boiling temperature for the liquefied gas can be raised by holding the liquefied gas at a higher pressure. The term "cryogenic temperature" is used herein to describe temperatures less than minus 100 degrees Celsius, at which a given gas can be stored in liquefied form at pressures less than 2 MPa (about 300 psig). To hold a liquefied gas at cryogenic temperatures, the storage vessel defines a thermally insulated cryogen space. Storage vessels for holding liquefied gases are known and a number of methods and associated apparatuses have been developed for removing liquefied gas from such storage vessels. The term "cryogenic fluid" is used herein to describe a fluid that is at a cryogenic temperature.

It is known to store a gaseous fuel, such as liquefied natural gas on board a vehicle for consumption by the vehicle's engine. Gaseous fuels such as, for example, natural gas, pure methane, hydrogen, and blends thereof are cleaner burning compared to conventional liquid fuels such as gasoline or diesel. Known approaches for consuming gaseous fuel on board a vehicle relate to introduction of the gaseous fuel into the engine's intake air manifold at relatively low pressures. For such applications, high-pressure cryogenic pumps are not needed, and at times the vapor pressure inside the storage vessel can alone be adequate, as taught by so-called economizer systems. For the relatively low pressures needed or desirable for gaseous fuels in commercially-known gaseous-fuelled engines, cryogenic pumps are not needed and are not used in conventional fuel systems that store a liquefied gaseous fuel at cryogenic temperatures. Recent developments have been directed to delivering a high-pressure gaseous fuel to an engine for injection directly into the combustion chamber; this approach enables the engine to emulate the performance and efficiency of a conventional diesel-cycle engine, which can be an improvement over known low-pressure fuel systems.

To supply a gaseous fuel to an engine at pressures high enough to allow direct injection into the combustion chamber, it is preferable to use a cryogenic pump to pump the liquefied gas, because this is more energy efficient compared to using a compressor to compress the fuel in the gaseous phase after the liquefied gaseous fuel has been vaporized. For example, for an engine that employs the same compression ratio as a conventional diesel engine, to inject a gaseous fuel directly into the combustion chamber, it is necessary or at least desirable to supply a gaseous fuel with a pressure that is substantially greater than the cylinder pressure at the time of injection. The required injection pressure is dependent upon the design of the engine. For example, to distinguish the presently disclosed method and apparatus from conventional "low pressure" gaseous fuel systems, for an engine used to power a vehicle like a truck, in order to inject a gaseous fuel directly into the engine's combustion chamber, a fuel injection pressure of at least about 20 MPa (about 3000 psi) is typically needed or at least desirable.

However, a problem with cryogenic pumps is that their performance can degrade over time for a variety of reasons. For example, if the cryogenic pump is a reciprocating piston pump, performance can degrade because of dynamic piston seal wear, and periodic maintenance is required to replace dynamic piston seals. The properties and consistency of quality of the process fluid that is being pumped is also a factor since impurities in the cryogenic fluid that are not caught by filters can accelerate the wear of dynamic piston seals and can also result in scoring of the pump cylinder. It is also possible that a manufacturing defect in a pump component can result in premature failure of the component and a consequent decline in pump performance. The manner in which a pump is operated and its duty cycle, including pump speed and frequency, can influence the longevity of wearing parts such as the dynamic seals. For example, in a vehicular application, the duty cycle can vary depending upon whether the vehicle is operated mostly on city streets or on-highway. Other causes of pump performance degradation can include static seal leakage, fitting leaking at connections between conduits and components, check valve leakage, or hydraulic system degradation or failure.

In a vehicular application, if cryogenic pump performance is allowed to degrade without diagnosing it and taking corrective action, vehicle performance can be affected, eventually forcing the vehicle to stop or be operated with a lower power output. Without a method of systematically diagnosing cryogenic pump performance, the only indication that something is wrong with the cryogenic pump is a change in vehicle performance and since there can be many other factors that influence vehicle performance, degraded pump performance can remain undetected until it is too late to take corrective action and the vehicle can be left stranded and/or damaged.

Accordingly, because there are a many potential causes of degradation in pump performance, that are unpredictable and that can affect pump performance before normal service intervals, there is a need for diagnosing cryogenic pump performance to determine pump performance over time, to detect when pump performance is degrading no matter what the cause, to establish appropriate service intervals, and to determine if a cryogenic pump requires maintenance between normal service intervals.

SUMMARY OF THE INVENTION

An apparatus for delivering a process fluid that is stored at a cryogenic temperature comprises:
 (a) a storage vessel defining a thermally insulated cryogen space for storing the process fluid;
 (b) a cryogenic pump with a suction inlet in communication with the cryogen space and a discharge outlet in communication with a delivery conduit;
 (c) a heat exchanger disposed along the delivery conduit such that process fluid flowing through the delivery conduit flows through the heat exchanger;
 (d) a pressure sensor for measuring process fluid pressure in the delivery conduit downstream from the heat exchanger;
 (e) an electronic controller programmed to:
   (i) monitor a signal representative of process fluid pressure that is measured by the pressure sensor;
   (ii) process the signal to determine from measured process fluid pressure when cryogenic pump performance is degraded; and
   (iii) send a signal to an operator of the apparatus to indicate when the electronic controller determines that cryogenic pump performance has degraded below a predetermined threshold volumetric efficiency.

The delivery conduit itself defines a volume that act as a reservoir for holding pressurized fluid downstream from the cryogenic pump, but in preferred embodiments the apparatus further comprises an accumulator vessel disposed downstream from the cryogenic pump. The accumulator vessel provides a greater storage volume for holding a larger amount of pressurized process fluid to smooth out fluctuations in fluid pressure caused by variable delivery or consumption rates, and pulses of pressurized process fluid delivered from the pump. The pressure sensor can measure process fluid pressure within the delivery conduit indirectly by measuring process fluid pressure within the accumulator vessel.

In one embodiment, the electronic controller can be programmed to calculate the change in measured process fluid pressure over a predetermined number of preceding pump cycles, and to determine that performance of the process pump has degraded if the calculated change in process fluid pressure is less than a predetermined threshold value.

The predetermined threshold value can be a fixed value, and the value of the predetermined threshold value can be arbitrary, but since a higher value will result in more false indications and a lower value gives less warning when pump efficiency is deteriorating, in this embodiment, the value for the predetermined threshold value is preferably between zero and the average change in process fluid pressure under normal operating condition when the pump is operating with its normal operating efficiency. When the predetermined threshold value is zero, this means that over the predetermined number of preceding pump cycles there has been no change in process fluid pressure, which means that the pump is only keeping up with delivering the same amount of process fluid into the delivery conduit as is being delivered from it, and no progress is being made in raising process fluid pressure from a low set point to a high set point. Of course, a negative change in pressure indicates that pump efficiency has degraded to the point where it is unable to keep up with the amount of process fluid that is being delivered from the delivery conduit.

Instead of being a fixed value, the electronic controller can determine the predetermined threshold value from a look up table as a function of the rate at which the process fluid has been removed from the delivery conduit and stroke rate of the cryogenic pump during the predetermined number of pump cycles. In yet another embodiment, the electronic controller can calculate the predetermined threshold value as a function of a known nominal mass flow capacity of the cryogenic pump, the predetermined number of preceding pumping cycles, and a calculated mass of the process fluid delivered from the delivery conduit. The nominal mass flow capacity of the cryogenic pump is its mass flow capacity when it is operating fully charged with its normal efficiency.

In another embodiment for determining when pump performance has degraded, the electronic controller is programmable to count the number of pump cycles needed to raise process fluid pressure from a predetermined low set point to a predetermined high set point. In this embodiment the electronic controller determines that performance of the process pump has degraded if the number of pump cycles counted is greater than a predetermined threshold number. The electronic controller determines the predetermined threshold number from a look up table as a function of average mass flow rate at which the process fluid was removed from the delivery conduit during the predetermined number of pump cycles. Instead of using a look up table, the electronic controller can calculates the predetermined threshold number as a function of a calculated number of pump cycles needed to raise process fluid pressure from the predetermined low set point to the predetermined high set point if the pump operates with a nominal mass flow capacity, after subtracting a calculated mass of the process fluid delivered from the delivery conduit.

In yet another embodiment of the apparatus the electronic controller is programmable to calculate a target process fluid pressure as a function of a known nominal mass flow capacity of the process pump, the number of pump cycles completed, and the rate that the process fluid was removed from the delivery conduit during the number of completed pump cycles; and determine that performance of the process pump is degraded if a process fluid pressure is a predetermined amount less than the target process fluid pressure.

In a preferred embodiment, the process fluid is a combustible fuel and the apparatus is a fuel supply system that delivers the process fluid to a combustion chamber of an internal combustion engine. The apparatus was developed for this application, but those familiar with the technology involved here will appreciate that the apparatus can be applied to applications in which a process fluid is pumped from a storage vessel to a delivery conduit in which process fluid pressure is maintained between a low set point and a high set point, and pump performance can degrade over time at an unpredictable rate because of operational variables.

The apparatus can include a plurality of pumps and storage vessels. For example, the apparatus can further comprising a second cryogenic pump that is in communication with the cryogen space or a second cryogen space defined by a second storage vessel, and a selector valve that is operable to select which one of the cryogenic pumps is operable to deliver the process fluid. When the electronic controller determines that the performance of one of the cryogenic pumps has degraded, the electronic controller can be programmed to actuate the selector valve to select the other one of the cryogenic pumps. If the electronic controller determines that the performance of both of the cryogenic pumps has degraded, the electronic controller can be programmed to determine which one of the cryogenic pumps has performance that is less degraded than that of the other, and to actuate the selector valve to select the one of the cryogenic pumps that has the less degraded performance.

A method of delivering a process fluid that is stored at a cryogenic temperature comprises:
(a) storing the process fluid inside a cryogen space defined by a storage vessel;
(b) pumping the process fluid from the cryogen space with a cryogenic pump;
(c) heating the process fluid to shift the process fluid into a gaseous phase;
(d) measuring process fluid pressure downstream from the cryogenic pump;
(e) determining from the measured process fluid pressure when performance of the cryogenic pump has degraded; and
(f) signaling to an operator of the cryogenic pump when its performance is degraded below a predetermined threshold volumetric efficiency.

The method of determining that cryogenic pump performance has degraded can further comprise:
(g) recording an initial measured process fluid pressure each time the cryogenic pump is commanded to an active pumping state;
(h) recording a final measured process fluid pressure after the cryogenic pump completes a predetermined number of consecutive pump cycles;
(i) calculating a change in process fluid pressure by subtracting the initial measured process fluid pressure from the final measured process fluid pressure;
(j) adding one to an error count if the change in process fluid pressure is less than a threshold value; and
(k) determining and signaling to an operator of the cryogenic pump that performance of the pump is degraded if the error count reaches a predetermined number $N_d$.

The method can further comprise subtracting one from the error count if the change in process fluid pressure is greater than a threshold value and the error count is a positive number.

In a preferred embodiment of the method, the threshold value can be a predetermined fixed value or it can be determined, for example, from a look up table as a function of the rate at which the process fluid was removed from the delivery conduit and stroke rate of the cryogenic pump during the predetermined number of consecutive pump cycles. In another embodiment, the method can further comprise calculating the threshold value as a function of a known nominal mass flow capacity of the cryogenic pump, the predetermined number of consecutive pump cycles, and a calculated mass of process fluid that was removed from a delivery conduit.

The method can further comprise determining that performance of the cryogenic pump has degraded if a calculated change in measured process fluid pressure is negative after a predetermined number of consecutive cryogenic pump cycles.

In another preferred embodiment, the method of determining when performance of the cryogenic pump has degraded comprises beginning a number count from zero each time the cryogenic pump is activated from an idle state, and adding 1 to the number count for each cryogenic pump cycle needed to raise process fluid pressure by a predetermined amount, and determining that performance of the cryogenic pump has degraded if the number count reaches a value that is greater than a predetermined threshold number.

A method of delivering a process fluid that is stored at a cryogenic temperature comprises:
(a) storing the process fluid inside a cryogen space defined by a storage vessel;
(b) pumping the process fluid from the cryogen space with a cryogenic pump;
(c) heating the process fluid to shift the process fluid into a gaseous phase;
(d) measuring process fluid pressure downstream from the cryogenic pump;
(e) commanding the cryogenic pump to an active pumping state when measured process fluid pressure is less than or equal to a predetermined low pressure set point;
(f) commanding the cryogenic pump to an idle state when measured process fluid pressure is greater than or equal to a predetermined high-pressure set point;
(g) recording an initial measured process fluid pressure each time the cryogenic pump is commanded to the active pumping state;
(h) recording a final measured process fluid pressure after the cryogenic pump completes a predetermined number of consecutive pump cycles;
(i) calculating a change in process fluid pressure by subtracting the initial measured process fluid pressure from the final measured process fluid pressure;
(j) adding one to an error count if the change in process fluid pressure is less than a threshold value; and
(k) determining and signaling to an operator of the cryogenic pump that performance of the pump is degraded if the error count reaches a predetermined number $N_d$.

A method of delivering a process fluid that is stored at a cryogenic temperature comprises:
(a) storing the process fluid inside a cryogen space defined by a storage vessel;
(b) pumping the process fluid from the cryogen space with a cryogenic pump;
(c) heating the process fluid to shift the process fluid into a gaseous phase;
(d) measuring process fluid pressure downstream from the cryogenic pump;
(e) commanding the cryogenic pump to an active pumping state when measured process fluid pressure is less than or equal to a predetermined low pressure set point;
(f) commanding the cryogenic pump to an idle state when measured process fluid pressure is greater than or equal to a predetermined high-pressure set point;
(g) detecting when the cryogenic pump is commanded to the active pumping state from the idle state, and keeping a number count of pump cycles performed by the cryogenic pump to raise process fluid pressure downstream from the cryogenic pump to the high pressure set point;
(h) resetting the number count to zero when the cryogenic pump is commanded to the idle state;
(i) adding one to an error count if the number count is greater than or equal to a threshold number; and
(j) determining and signaling to an operator of the cryogenic pump that performance of the pump is degraded if the error count reaches a predetermined number $N_d$.

DETAILED DESCRIPTION OF PREFERRED EMBODIMENT(S)

With reference to the figures, like-named components with like reference numbers separated by multiples of one hundred refer to like components in different embodiments. In the illustrated embodiments, the apparatus is shown in the context of an application for storing a liquefied gaseous fuel at a cryogenic temperature, and delivering pressurized gaseous fuel to a fuel injection valve for injection at high pressure directly into the combustion chamber of an engine. In this application the process fluid, which is also referred to as the cryogenic fluid, is the fuel that is combusted in the combustion chamber of the engine. While this is a particularly useful application of the disclosed technology, persons familiar with the technology involved here will understand that the application of the invention is not limited to the illustrated example, and that many other applications which pump a fluid to a high pressure can benefit from a method of diagnosing when performance of the pump is degrading, signaling a need or desire to stop the pump or to schedule maintenance to restore performance to normal levels.

Figure 1:
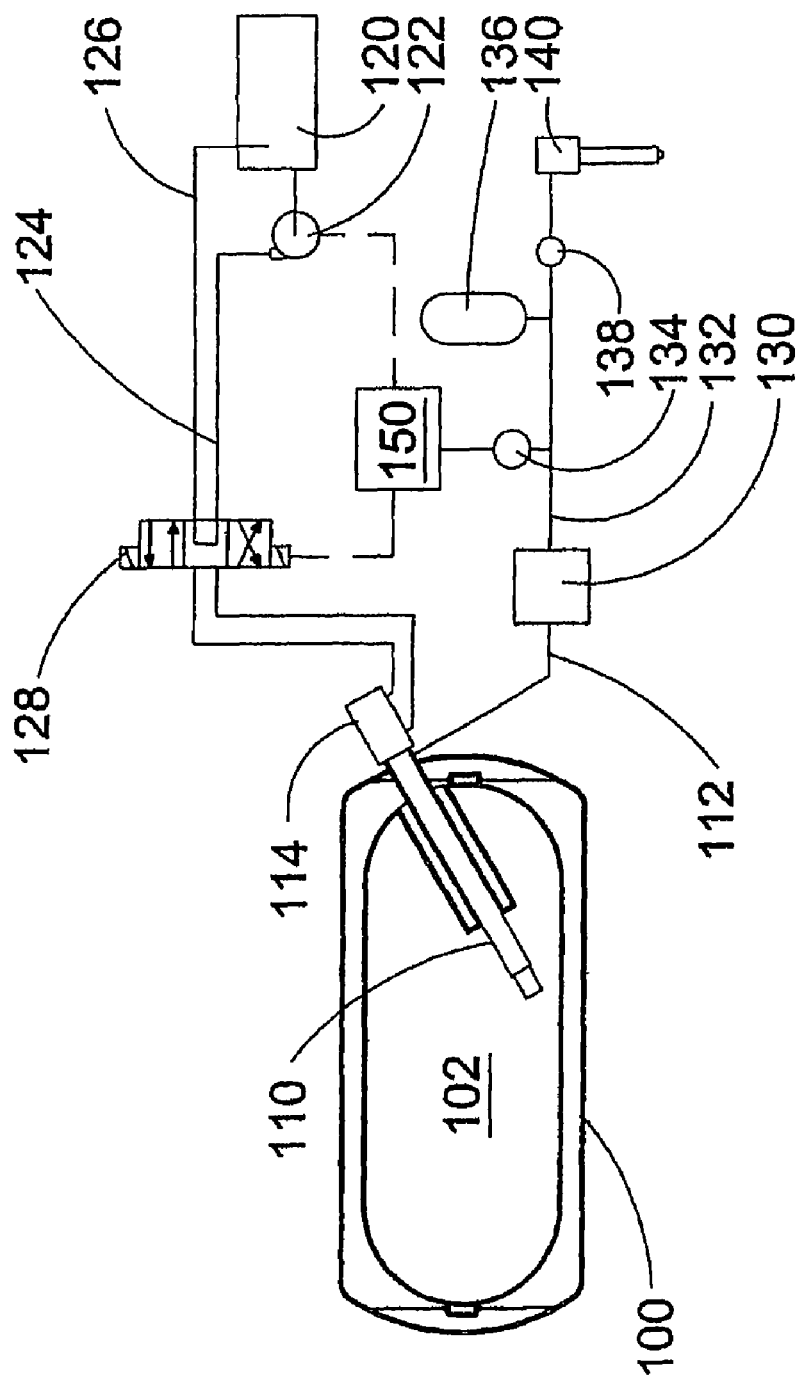
FIG. 1 is a schematic diagram of a storage vessel with a cryogenic pump for pumping a process fluid that can be stored within the storage vessel, a process fluid pressure sensor, and an electronic controller.

FIG. 1 is a schematic view of an apparatus for pumping a cryogenic fluid from storage vessel 100 that defines thermally insulated cryogen space 102. In this illustrated embodiment cryogenic pump 110 is disposed within cryogen space 102, however persons familiar with the technology involved here will understand that the disclosed apparatus and method can be applied to other arrangements for storage vessels and associated pumps. For example, the disclosed apparatus and method can be applied to a multi-storage vessel arrangement like the embodiment shown in FIG. 3, in which each storage vessel has its own cryogenic pump disposed in its respective cryogen space. In another embodiment, the cryogenic pump can be disposed outside of the cryogen space and one pump can deliver cryogenic fluid from more than one storage vessel.

In preferred embodiments, the cryogenic pump is a positive displacement pump such as one that employs a reciprocating piston to pump the cryogenic fluid. The cryogenic pump can employ a single-acting piston or a double-acting piston.

With reference to the embodiment of FIG. 1, cryogenic pump 110 pumps cryogenic fluid from cryogen space 102 into conduit 112. A drive shaft operatively connects cryogenic pump 110 to hydraulic drive unit 114, which in the illustrated embodiment is located outside of the cryogen space. The extended length of the drive shaft in the shown embodiment helps to reduce heat leak into cryogen space 102. In the preferred embodiment, hydraulic drive unit 114 comprises a hydraulically driven piston that reciprocates by directing pressurized hydraulic fluid to opposite sides of the piston in alternating fashion. Such hydraulic drive units for producing linear reciprocating motion are well known. That is, a hydraulic fluid chamber associated with one side of the hydraulically driven piston is filled with pressurized hydraulic fluid from high-pressure conduit 124, while a hydraulic fluid chamber associated with the opposite side of the hydraulic piston communicates with drain line 126 that returns hydraulic fluid to the hydraulic pump 122 or a hydraulic fluid reservoir 120. The hydraulic drive system comprises one or more valves that are operable when the hydraulically driven piston completes its stroke, so that by operation of the valve(s) the hydraulic fluid chamber previously in communication with drain line 126 is in communication with high-pressure conduit 124 that supplies the pressurized hydraulic fluid and the other hydraulic fluid chamber is in communication with drain line 126. Upon actuating the valve(s) at the end of a piston stroke, and switching the hydraulic fluid connections to the hydraulic fluid chambers, the pressurized hydraulic fluid acts on the hydraulic piston to reverse the direction of linear movement. In a preferred embodiment, the hydraulic fluid valve can be schematically illustrated valve 128, which comprises an electronically actuated block with ports for switching the flow from high-pressure conduit 124 from one hydraulic fluid chamber to the other at the same time that the opposite hydraulic fluid chamber is connected to drain line 126. The valve block can also include ports (shown schematically in the middle of the valve block in FIG. 1) for re-circulating the hydraulic fluid without driving hydraulic drive unit 114. This feature can be employed, for example when hydraulic pump 122 is mechanically driven by an engine and hydraulic pump 122 is continuously operated when the engine is running, even when cryogenic pump 110 is idle.

In preferred embodiments, the described hydraulic drive unit is employed, but other types of drive units can be substituted without departing from the scope of the present apparatus and method. By way of example, without limiting the types of drive units that could be employed instead of a hydraulic drive unit, the pump could be driven by an electrically or mechanically driven crank or pneumatic drive unit.

Process fluid discharged from pump 110 flows through conduit 112 to heater 130. In the illustrated application, heater 130 can be a heat exchanger with the process fluid being heated by a warmer fluid such as engine coolant, which can exit the engine's cooling jacket with a temperature of about 80-85 degrees Celsius during steady engine operating conditions. Because the process fluid that exits heater 130 into delivery conduit 132 is at a pressure of at least 20 MPa (about 3000 psi) the process fluid is in a supercritical fluid state. Accumulator 136 stores a buffer of pressurized process fluid so that after the accumulator is filled, an adequate supply of process fluid is available as needed or desired. Fuel conditioning module 138 can comprise a number of components in an integrated assembly, but one of the main functions of fuel conditioning module 138 is to regulate the pressure of the process fluid that is delivered to fuel injection valve 140. Fuel conditioning module 138 can comprise other components integrated into this module such as a pressure relief valve and/or a shut off valve that can be closed to allow the accumulator to remain pressurized when the system is shut down. The shut off valve prevents a leak of process fluid from accumulator 136 if the engine is shut down and one of fuel injection valves 140 is stuck open or if there is a leak in the conduits that deliver pressurized fuel from delivery conduit 132 to the fuel injection valves 140.

Electronic controller 150 communicates with pressure sensor 134, valve 128 and optionally hydraulic pump 122. Valve 128 has a by-pass position so that pump 110 can be stopped without stopping hydraulic pump 122, which can be employed to also supply high-pressure hydraulic fluid to other systems (not shown).

In preferred embodiments, during normal operation of the apparatus, electronic controller 150 is programmed to maintain pressure in accumulator 136 between a low set point and a high set point. Process fluid pressure is substantially the same in delivery conduit 132 and accumulator 136. Electronic controller 150 uses pressure sensor 134 to monitor process fluid pressure in the accumulator. Under normal operating conditions, when the engine is running and burning fuel in the combustion chamber, process fluid pressure in the accumulator decreases as fuel is removed from delivery conduit 132 and combusted in the engine. When process fluid pressure drops to the low set point, pump 110 is activated to pump process fluid from storage vessel 100 to delivery conduit 132 until the process fluid pressure measured by pressure sensor 134 is increased to the high set point, whereupon pump 100 is commanded to stop. Electronic controller 150 preferable applies a first order filter to the process fluid pressure measurements to compensate for large fluctuations in process fluid pressure during transients. For example, during changes in engine speed and load, pressure pulsations in the delivery conduit can cause dramatic changes in the measured process fluid pressure.

Electronic controller 150 determines if the performance of pump 110 has degraded by determining from measured process fluid pressure if the pump's volumetric efficiency is lower than normal. In the disclosed apparatus, the mass flow capacity of pump 110 is specified to be greater than the maximum mass flow from delivery conduit 132 to the end user, which is the engine in the illustrated application. In this application, the maximum mass flow from delivery conduit 132 to the engine is when the engine is running at full load and consuming fuel at the maximum rate. If the mass flow capacity of pump 110 is not greater than the maximum mass flow to the engine, then pump 110 will be unable to increase process fluid pressure from the low set point to the high set point if the process fluid pressure drops to the low set point when the engine is running at full load for an extended period.

Figure 2:
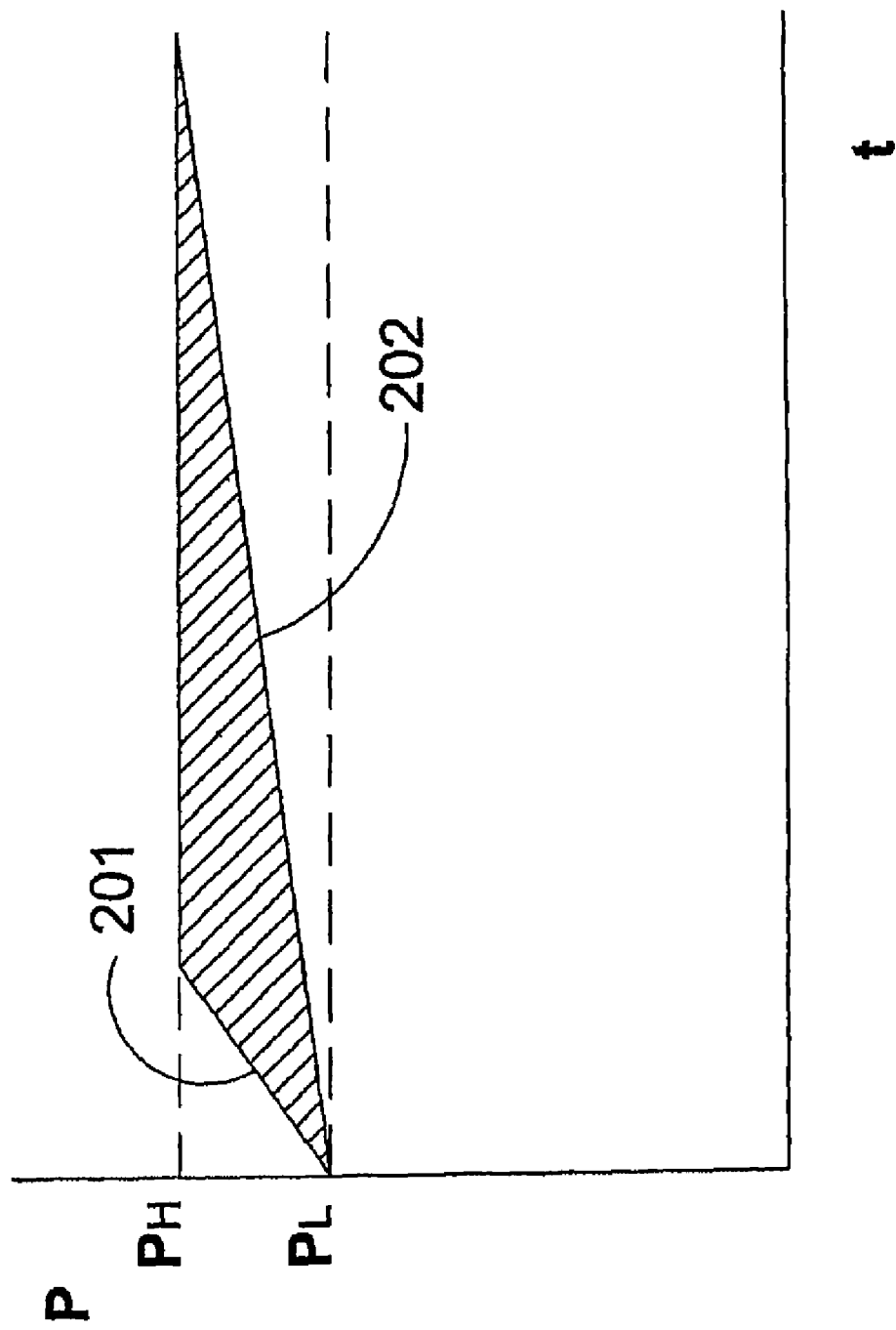
FIG. 2 is a graph that plots process fluid pressure against time, illustrating the desired effect of operating a cryogenic pump on process fluid pressure to increase process fluid pressure from a low set point to a high set point when the pump is operating with normal volumetric efficiency.

FIG. 2 is a plot of process fluid pressure against time, showing the time it takes for a pump to increase process fluid pressure from the low set point $P_L$ to high set point $P_H$. This plot is representative of the described embodiments. If the mass flow capacity of the pump is properly specified, the slope of the lines graphed in FIG. 2 will always be positive as long the as the volumetric efficiency of the pump is not degraded, and the pump is operated at a normal speed when the engine is running at full load. Line 201 represents the fastest rate for increasing process fluid pressure, which occurs when pump 110 is operating at full speed, and there is very little or no process fluid being removed from delivery conduit 132, such as, for example, when a vehicle is descending down a hill, idling, or driving without pulling a load. Line 202 represents the slowest rate for increasing fluid pressure when the pump is performing normally. Along line 202 the pressure is rising at a much slower rate, and this can occur when the process fluid is being removed from delivery conduit 132 at the maximum mass flow rate, or when the engine is heavily loaded with the pump operating at a low speed. The triangle defined by line 201, line 202 and high set point $P_H$ outlines the area within which process fluid pressure is increased from $P_L$ to $P_H$ when the pump is operating with its normal volumetric efficiency. If process fluid pressure is increased from $P_L$ to $P_H$ along a line with a shallower slope than line 202, then it is determined that there has been a decline in the pump's volumetric efficiency and its performance has degraded. A negative slope indicates that the pump's performance has degraded to the point where it can no longer supply process fluid to the delivery conduit at a rate that can keep up with the rate at which process fluid is being removed from the delivery conduit. The disclosed method for diagnosing the performance of the pump relates to monitoring process fluid pressure and the rate at which the process fluid pressure in the delivery conduit and accumulator is increased from low set point $P_L$ to high set point $P_H$ to determine when pump performance has degraded.

Figure 3:
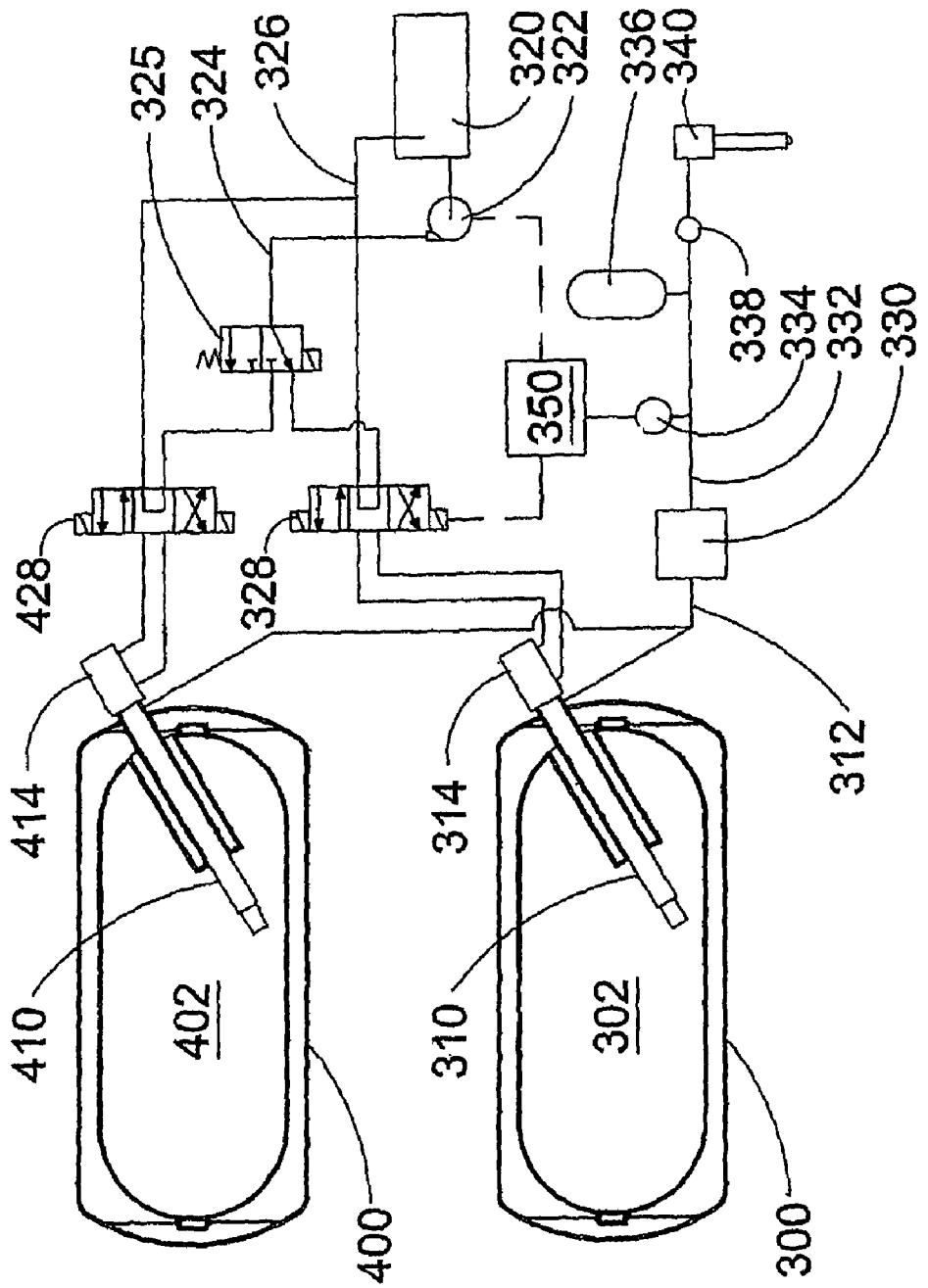
FIG. 3 is a schematic diagram of a system with two storage vessels, each with its own internal pump, a process fluid pressure sensor, an electronic controller, and a drive system controllable by the electronic controller to switch from activating one pump to activating the other pump.

FIG. 3 is a schematic view of an apparatus that comprises two storage vessels 300 and 400, which each defines respective cryogen spaces 302 and 402. Pump 310 is disposed inside cryogen space 302 and pump 410 is disposed in cryogen space 402. In the illustrated embodiment, pumps 310 and 410 are hydraulically driven by respective hydraulic drive units 314 and 414. Hydraulic fluid pump 322 pumps hydraulic fluid to hydraulic drive units 314 and 414 from reservoir 320 via high pressure conduit 324, selector valve 325 and flow switching valves 328 and 428. Hydraulic fluid is returned to reservoir 320 via drain conduit 326. Process fluid is pumped from the cryogen spaces to heater 330 through conduit 312. From heater 330 the process fluid flows in delivery conduit 332 and accumulator 336. Pressure sensor 334 is shown located along delivery conduit 332 to measure process fluid pressure therein, but the pressure sensor could measure process fluid pressure within accumulator 336 with the same result. A valve in fuel conditioning module 338 regulates the flow of process fluid delivered from delivery conduit 332 to fuel injection valves 340. Electronic controller 350 is programmable to command operation of selector valve 325 and flow switching valves 328 and 428. Electronic controller is also in communication with pressure sensor 334 and is programmable to process the pressure measurements from pressure sensor 334 to determine if the performance of a cryogenic pump is degrading; the manner in which electronic controller 350 makes this determination is the same as that of electronic controller 150 in the embodiment of FIG. 1. A difference with the embodiment of FIG. 3 is that, since there are two cryogenic pumps, if electronic controller 350 determines that the performance of one of the pumps is degraded, electronic controller 350 can deactivate the pump with poor performance and activate the pump with the higher performance by operation of selector valve 325. If electronic controller 350 determines that a pump's performance is degraded but not severely so, electronic controller 350 can limit activation of such a pump to times when process fluid is delivered from delivery conduit 332 at a relatively slow rate, while preventing a pump with poor performance from operating when process fluid is being delivered from delivery conduit 332 at the maximum mass flow rate.

Figure 4:
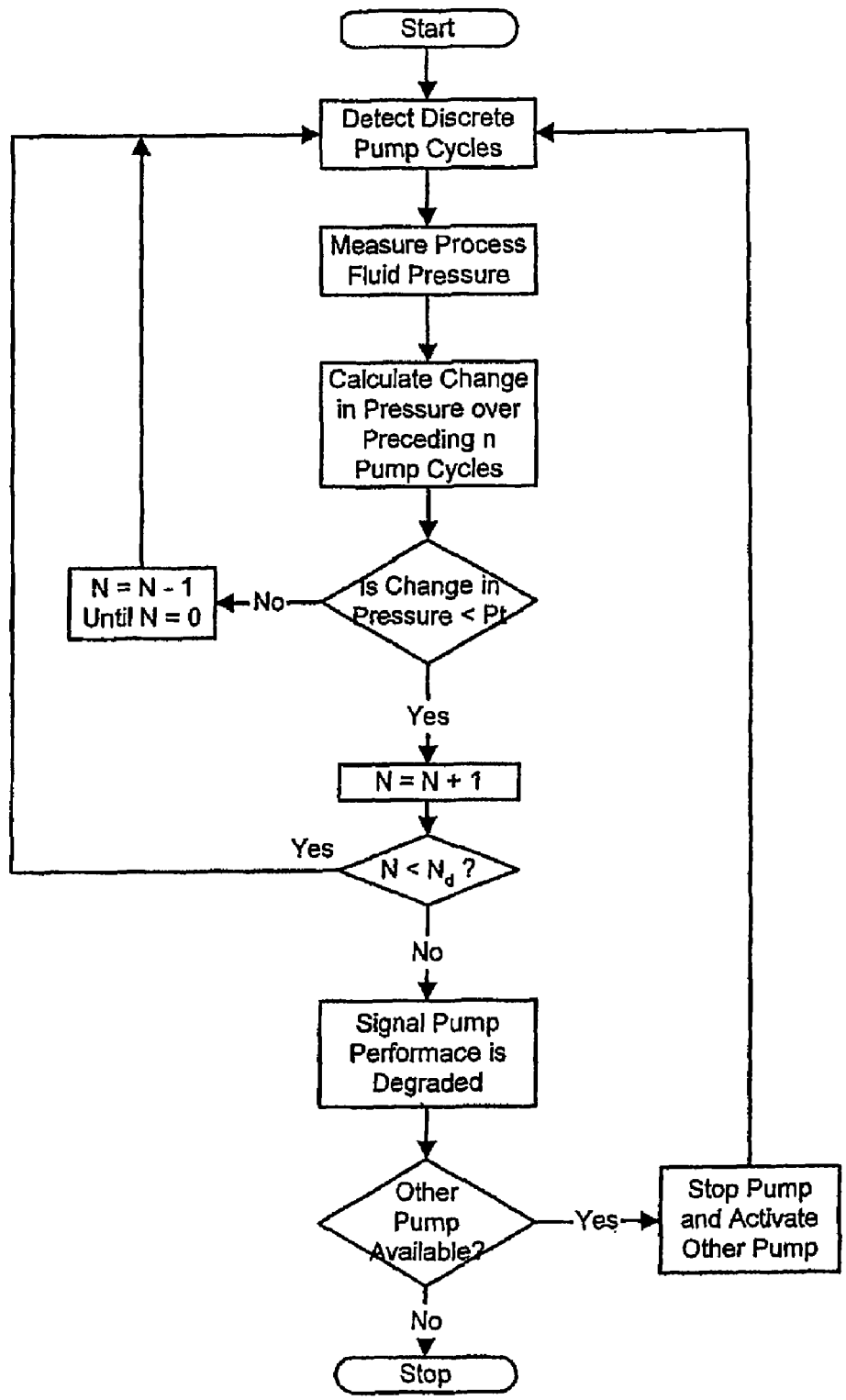
FIG. 4 is a diagram that illustrates a method of determining when the performance of a cryogenic pump has degraded based upon the change in process fluid pressure over a predetermined number of pump cycles.
Figure 5:
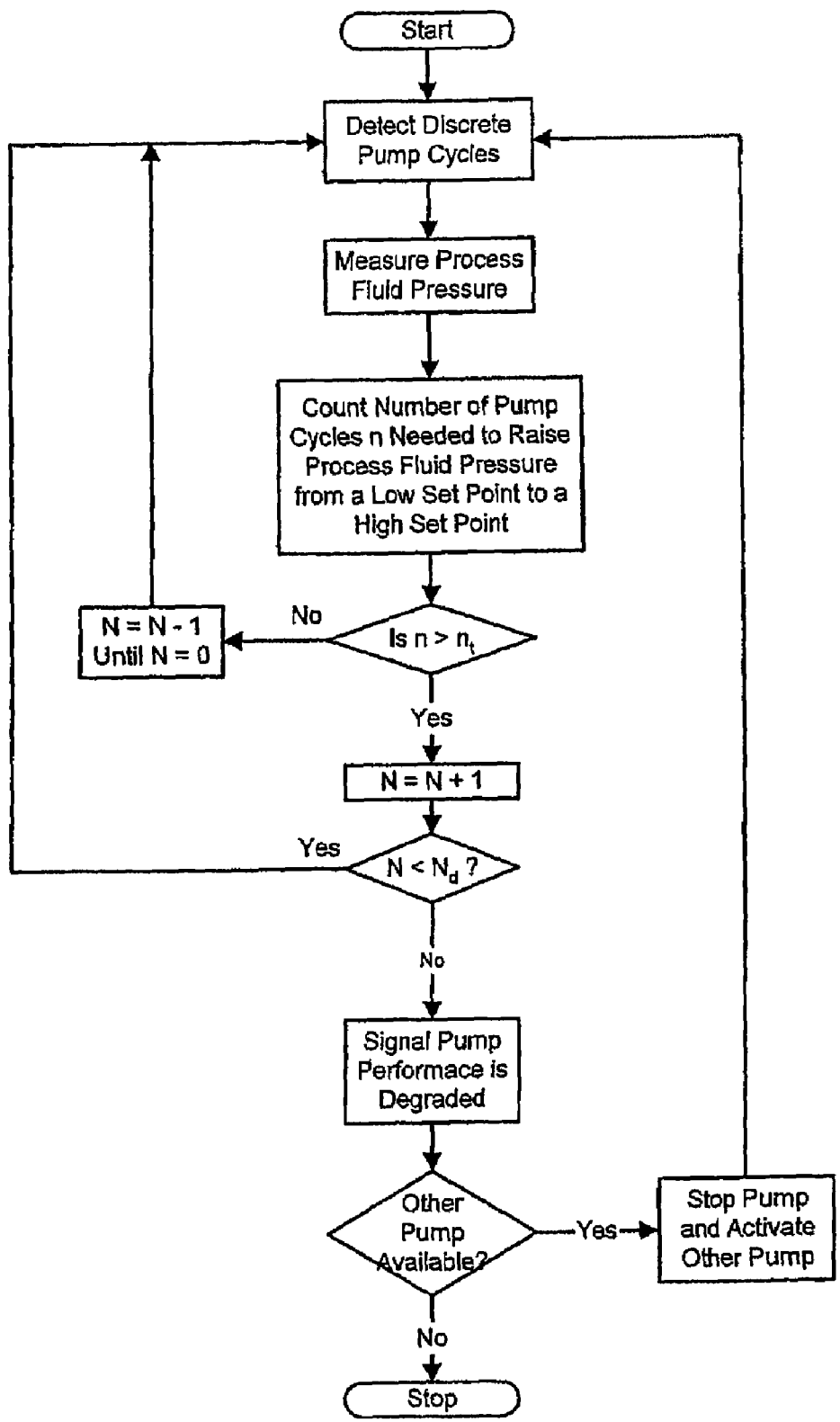
FIG. 5 is a diagram that illustrates another method of determining when the performance of a cryogenic pump has degraded based upon the number of pump cycles required to increase process fluid pressure by a predetermined amount.

FIGS. 4 and 5 are diagrams of control strategies that an electronic controller can be programmed to follow to implement the disclosed method using the described apparatus. With reference to FIG. 4, the control strategy begins by detecting discrete pump cycles. Process fluid pressure is measured and the change in process fluid pressure is calculated over the preceding n pump cycles, where n is a predetermined fixed number. The number n is arbitrary and could be, for example, 10. To determine if pump performance has degraded, the measured change in process fluid pressure over n pump cycles can be compared to a threshold pressure increase Pt.

Pt can be the minimum increase in process fluid pressure over n pump cycles that is possible if the pump is functioning at its normal performance level, so that a process fluid pressure increase that is less than Pt indicates that pump performance has degraded from its normal performance level. With this set up, Pt is the pressure increase that would be achieved if the pressure increase follows the slope of line 202 in FIG. 2. In another embodiment threshold pressure increase Pt can be selected from a table as a function of the amount of process fluid delivered from the delivery conduit over the n pump cycles taking into account the amount of process fluid delivered to the delivery conduit calculated from the nominal mass flow rate per pump cycle multiplied by n pump cycles. The nominal mass flow rate per pump cycle is defined herein as the mass flow rate that is delivered by the pump in a single pump cycle if it is operating with its normal performance and volumetric efficiency. Instead of using a table, Pt can be calculated by calculating an expected change in mass by subtracting the mass of process fluid delivered from the delivery conduit from the expected mass of process fluid delivered to the delivery conduit, calculated as a function of the nominal mass flow rate of the pump and the number of pump cycles, and then calculating the expected change in process fluid pressure from the calculated expected change in mass. In a simplified embodiment, Pt can be a predetermined fixed value that is lower than an average increase in process fluid pressure over n pump cycles.

If after n pump cycles, the measured increase in process fluid pressure is not less than Pt, then there is no indication that the pump is performing below its normal level. Conversely, if after n pump cycles the measured increase in process fluid pressure is less than Pt, then this could indicate that there is degradation in the performance of the pump. A single indication that pump performance is degraded may not be conclusive. In order to screen out false and abnormal readings, the electronic controller can be programmed to not determine that there is in fact a degradation in performance unless this result is repeated a predetermined number of times ($N_d$). For this purpose, the methods illustrated by the diagrams set out in FIGS. 4 through 6 include a counter feature, to count the number of times N that the electronic controller makes a calculation that indicates that there might be a degradation in pump performance. The number N is stored in memory and can be reduced by one until N equals zero, each time a subsequent calculation gives no indication that there has been a degradation in pump performance. However, if N increases in value to $N_d$, the electronic controller determines that pump performance has degraded and issues a signal to indicate this. If the pump is part of a multi-pump system, if another pump is available, the pump with degraded performance can be stopped and another pump can be activated, with the same method applied to the newly activated pump to determine when its performance is degraded.

In another embodiment, not shown in FIGS. 4 and 5, the number N is not reduced by one if a subsequent calculation gives no indication that there has been a degradation in pump performance, or a separate running count is recorded of the number of times that the pump was unable to keep up with the desired rate of recharging the delivery conduit and accumulator. If N is not reduced by 1, to help screen out false indications, the value of Pt can be lowered and/or the value of Nd can be increased.

Even when a pump's performance has degraded it can still be operated at times when a high mass flow rate of process fluid is not needed and if there is process fluid still remaining in the storage vessel that is associated with that pump.

The method diagrammed in FIG. 5 is substantially the same as the method diagrammed in FIG. 4, but with a simplified method of using measured process fluid pressure to determine when pump performance could be degraded. In the method of FIG. 5, the electronic controller simply counts the number of pump cycles n needed to raise process fluid pressure from a low set point to a high set point, which could be the set points that define the pressure range in the delivery conduit and accumulator, or arbitrary set points within that range. The counted number of pump cycles n is compared to a threshold number of pump cycles $n_t$. The threshold number of pump cycles $n_t$ could be a predetermined fixed number that under most operating conditions represents an ample number of pump cycles for increasing process fluid pressure from the low set point to the high set point. If there are times when the pump is functioning at normal performance levels and n is greater than $n_t$, this will result in an increase in the number N but as long as the pump continues to operate at normal performance levels, subsequent determinations by the electronic controller will result in a reduction in the number N when n is not greater than $n_t$. Like in the embodiment of the method in FIG. 4, when N is not less than $N_d$, the electronic controller signals that pump performance is degraded.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. An apparatus for delivering a process fluid that is stored at a cryogenic temperature comprises:
    (a) a storage vessel defining a thermally insulated cryogen space for storing said process fluid;
    (b) a cryogenic pump with a suction inlet in communication with said cryogen space and a discharge outlet in communication with a delivery conduit;
    (c) a heat exchanger disposed along said delivery conduit such that process fluid flowing through said delivery conduit flows through said heat exchanger;
    (d) a pressure sensor for measuring process fluid pressure in said delivery conduit downstream from said heat exchanger; and
    (e) an electronic controller programmed to:
        (i) monitor a signal representative of process fluid pressure that is measured by said pressure sensor;
        (ii) process said signal to determine from measured process fluid pressure when cryogenic pump performance is degraded; and
        (iii) send a signal to an operator of the apparatus indicating when said electronic controller determines that cryogenic pump performance has degraded below a predetermined threshold volumetric efficiency;
    (f) an accumulator vessel disposed downstream from said cryogenic pump;
        wherein said pressure sensor measures process fluid pressure within said delivery conduit indirectly by measuring process fluid pressure within said accumulator vessel.

2. The apparatus of claim 1 wherein said process fluid is a combustible fuel and said apparatus is a fuel supply system that delivers said process fluid to a combustion chamber of an internal combustion engine.

3. The apparatus of claim 1 further comprising a second reciprocating piston cryogenic pump that is in communication with said cryogen space or a second cryogen space defined by a second storage vessel, and a selector valve that is operable to select which one of said reciprocating piston cryogenic pumps is operable to deliver said process fluid.

4. A method of delivering a process fluid that is stored at a cryogenic temperature comprises:
    (a) storing said process fluid inside a cryogen space defined by a storage vessel;
    (b) pumping said process fluid from said cryogen space with a cryogenic pump;
    (c) heating said process fluid to shift said process fluid into a gaseous phase;

(d) measuring process fluid pressure downstream from said cryogenic pump;

(e) determining from said measured process fluid pressure when performance of said cryogenic pump has degraded; and (f) signaling to an operator of said cryogenic pump when its performance is degraded below a predetermined threshold volumetric efficiency;

wherein said method of determining that cryogenic pump performance has degraded further comprises:

(g) recording an initial measured process fluid pressure each time said cryogenic pump is commanded to an active pumping state;

(h) recording a final measured process fluid pressure after said cryogenic pump completes a predetermined number of consecutive pump cycles;

(i) calculating a change in process fluid pressure by subtracting said initial measured process fluid pressure from said final measured process fluid pressure;

(j) adding one to an error count if said change in process fluid pressure is less than a threshold value; and (k) determining and signaling to an operator of said cryogenic pump that performance of said pump is degraded if said error count reaches a predetermined number $N_d$.

5. The method of claim 4 wherein said threshold value is a predetermined fixed value.

6. The method of claim 4 further comprising determining said threshold value from a look up table as a function of the rate at which said process fluid was removed from said delivery conduit and stroke rate of said cryogenic pump during said predetermined number of consecutive pump cycles.

7. The method of claim 4 further comprising calculating said threshold value as a function of a known nominal mass flow capacity of said cryogenic pump, said predetermined number of consecutive pump cycles, and a calculated mass of process fluid that was removed from a delivery conduit.

8. The method of claim 4 further comprising subtracting one from said error count if said change in process fluid pressure is greater than a threshold value and said error count is a positive number.

9. A method of delivering a process fluid that is stored at a cryogenic temperature comprises:

(a) storing said process fluid inside a cryogen space defined by a storage vessel;

(b) pumping said process fluid from said cryogen space with a cryogenic pump;

(c) heating said process fluid to shift said process fluid into a gaseous phase;

(d) measuring process fluid pressure downstream from said cryogenic pump;

(e) determining from said measured process fluid pressure when performance of said cryogenic pump has degraded; and (f) signaling to an operator of said cryogenic pump when its performance is degraded below a predetermined threshold volumetric efficiency;

wherein said method further comprises beginning a number count from zero each time said cryogenic pump is activated from an idle state, and adding 1 to said number count for each cryogenic pump cycle needed to raise process fluid pressure by a predetermined amount, and determining that performance of said cryogenic pump has degraded if said number count reaches a value that is greater than a predetermined threshold number.

10. A method of delivering a process fluid that is stored at a cryogenic temperature comprises:

(a) storing said process fluid inside a cryogen space defined by a storage vessel;

(b) pumping said process fluid from said cryogen space with a cryogenic pump;

(c) heating said process fluid to shift said process fluid into a gaseous phase;

(d) measuring process fluid pressure downstream from said cryogenic pump;

(e) commanding said cryogenic pump to an active pumping state when measured process fluid pressure is less than or equal to a predetermined low pressure set point;

(f) commanding said cryogenic pump to an idle state when measured process fluid pressure is greater than or equal to a predetermined high-pressure set point;

(g) recording an initial measured process fluid pressure each time said cryogenic pump is commanded to said active pumping state;

(h) recording a final measured process fluid pressure after said cryogenic pump completes a predetermined number of consecutive pump cycles;

(i) calculating a change in process fluid pressure by subtracting said initial measured process fluid pressure from said final measured process fluid pressure;

(j) adding one to an error count if said change in process fluid pressure is less than a threshold value; and (k) determining and signaling to an operator of said cryogenic pump that performance of said pump is degraded if said error count reaches a predetermined number $N_d$.

11. A method of delivering a process fluid that is stored at a cryogenic temperature comprises:

(a) storing said process fluid inside a cryogen space defined by a storage vessel;

(b) pumping said process fluid from said cryogen space with a cryogenic pump;

(c) heating said process fluid to shift said process fluid into a gaseous phase;

(d) measuring process fluid pressure downstream from said cryogenic pump;

(e) commanding said cryogenic pump to an active pumping state when measured process fluid pressure is less than or equal to a predetermined low pressure set point;

(f) commanding said cryogenic pump to an idle state when measured process fluid pressure is greater than or equal to a predetermined high-pressure set point;

(g) detecting when said cryogenic pump is commanded to said active pumping state from said idle state, and keeping a number count of pump cycles performed by said cryogenic pump to raise process fluid pressure downstream from said cryogenic pump to said high pressure set point;

(h) resetting said number count to zero when said cryogenic pump is commanded to said idle state, (i) adding one to an error count if said number count is greater than or equal to a threshold number; and (j) determining and signaling to an operator of said cryogenic pump that performance of said pump is degraded if said error count reaches a predetermined number $N_d$.

* * * * *